No. 683,846. Patented Oct. 1, 1901.
G. D. CAMPBELL.
ICE CREAM FREEZER.
(Application filed Dec. 27, 1900.)
(No Model.)
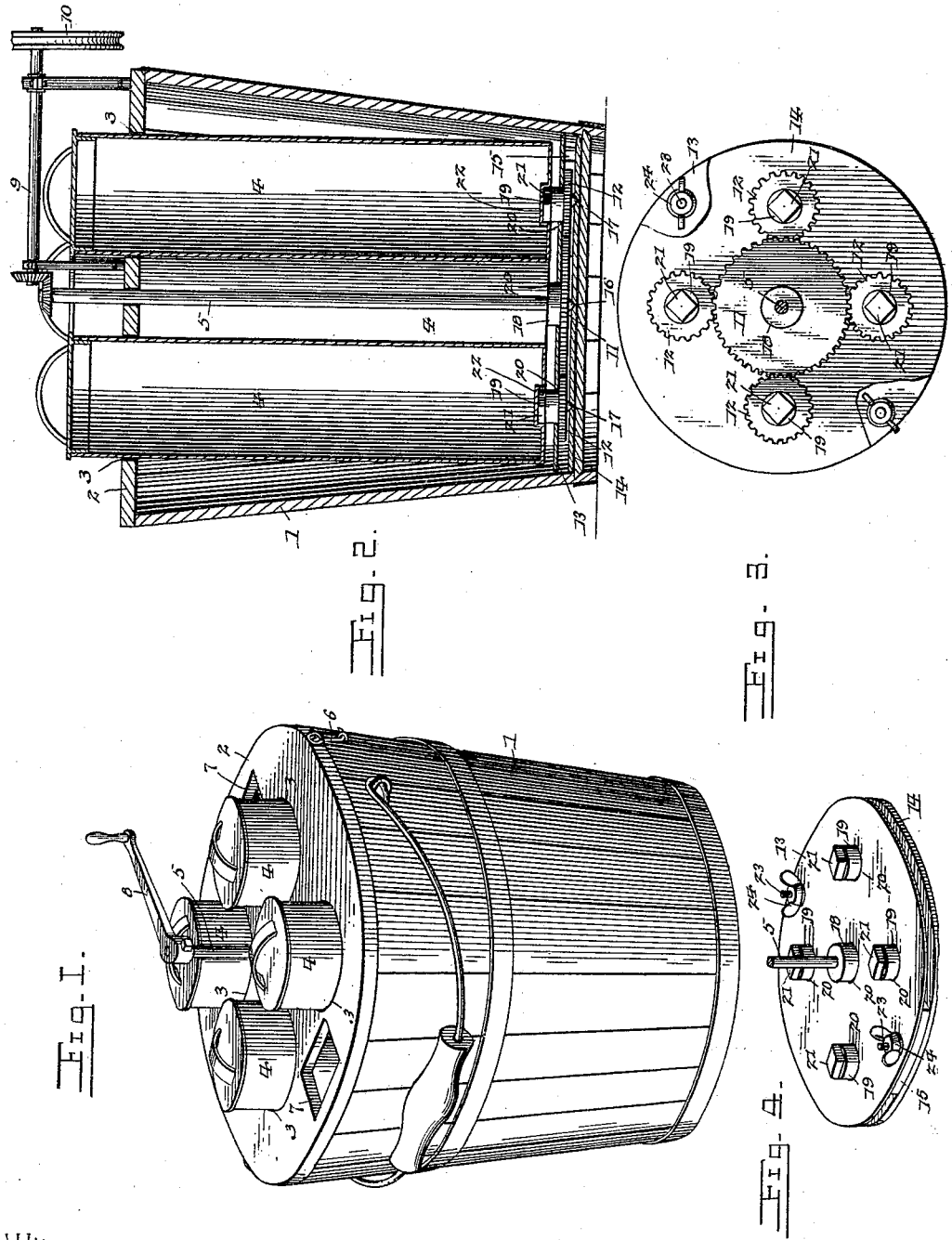
Witnesses
F. E. Alden
H. H. Riley
G. D. Campbell, Inventor.
by C. A. Snow & Co.
Attorneys

UNITED STATES PATENT OFFICE.

GEORGE D. CAMPBELL, OF COLUMBIANA, ALABAMA.

ICE-CREAM FREEZER.

SPECIFICATION forming part of Letters Patent No. 683,846, dated October 1, 1901.

Application filed December 27, 1900. Serial No. 41,265. (No model.)

*To all whom it may concern:*

Be it known that I, GEORGE D. CAMPBELL, a citizen of the United States, residing at Columbiana, in the county of Shelby and State of Alabama, have invented a new and useful Ice-Cream Freezer, of which the following is a specification.

The invention relates to improvements in ice-cream freezers.

The object of the present invention is to improve the construction of ice-cream freezers and to provide a simple and comparatively inexpensive one adapted to be conveniently operated at the least expense and with a minimum amount of labor and capable of enabling a variety of flavors to be simultaneously frozen.

A further object of the invention is to provide an ice-cream freezer of this character in which gearing will not have to be removed after the cream has been frozen, so that there will be no liability of accidentally getting salt into the cream; and the invention also has for its object to provide gearing adapted to be arranged within an ordinary receptacle, such as a bucket or tub, and capable of operating without liability of becoming clogged with salt and ice.

The invention consists in the construction and novel combination and arrangement of parts hereinafter fully described, illustrated in the accompanying drawings, and pointed out in the claims hereto appended.

In the drawings, Figure 1 is a perspective view of an ice-cream freezer constructed in accordance with this invention. Fig. 2 is a vertical sectional view of the same. Fig. 3 is a detail view illustrating the arrangement of the gearing. Fig. 4 is a similar view illustrating the manner of mounting and housing the gearing.

Like numerals of reference designate corresponding parts in all the figures of the drawings.

1 designates a receptacle, which may consist of a bucket, as illustrated in the accompanying drawings; but a tub or any other suitable receptacle may be provided, and detachably secured to the receptacle is a cover 2, which is provided with a series of circular openings 3 for the reception of ice-cream cans 4, which are arranged around a central shaft 5. The lid, which is detachably secured to the receptacle by suitable fastening devices 6, is provided at opposite sides with rectangular openings 7 to enable salt to be readily applied, as required.

The central shaft 5, which is disposed vertically, extends through a central aperture of the cover, and it may be provided with a handle 8, as illustrated in Fig. 1 of the accompanying drawings, or it may be connected by bevel-gearing with a horizontal shaft 9, journaled in suitable bearings and provided at its outer end with a pulley 10, adapted to be driven by any suitable motive power. The lower end of the vertical shaft is connected with a centrally-arranged gear-wheel 11, which meshes with a series of pinions 12, located at different points around the gear-wheel and connected with and adapted to rotate the cans 4, whereby the contents of the latter are frozen. The gearing, which is arranged horizontally, as clearly illustrated in Fig. 2 of the accompanying drawings, is housed between upper and lower horizontal plates 13 and 14, connected by suitable fastening devices and spaced apart by blocks 15 and extending entirely across and abutting against the inner walls of the receptacle, whereby salt and ice are excluded from the gearing and the latter prevented from becoming clogged. The central gear-wheel is provided with a central depending tapered projection 16, forming a journal, and the pinions are provided with similar depending projections or journals 17, and these journals fit against the upper face of the lower horizontal plate and space the gearing therefrom. The gear-wheel and pinions are provided at their upper faces with hubs 18 and 19, journaled in suitable bearing-openings 20 of the upper horizontal plate, and the hubs 19 of the pinions are provided with polygonal extensions or enlargements 21, preferably squared, as illustrated in the accompanying drawings, and fitting in corresponding sockets 22 of the bottoms of the cans, whereby the latter are detachably interlocked with the pinions and are adapted to be readily placed on and removed from the enlargements or extensions 21. When the central shaft is rotated, the motion will be communicated to the pinions and the cans will be rapidly rotated. The bottom plate 14, which rests upon the bottom of the receptacle, is provided with bolts 23, and the top plate is engaged by thumb-nuts 24, arranged on the threaded portions of the bolts; but any other suitable fastening devices may be employed for detachably connecting the plates which retain the gearing in operative position and which when separated enable the gear-wheels to be readily removed.

The receptacle is designed to be filled with ice in the usual manner, and the salt which is necessary may be applied from time to time through the rectangular apertures of the cover which supports the cans, and as the latter extend some distance above the cover there is no liability of salt getting into them; also, after the freezing has been effected it is not necessary to remove any gearing from the cans, and the latter may be readily taken out of the receptacle.

It will be seen that the ice-cream freezer is exceedingly simple and inexpensive in construction, that it is adapted to be conveniently operated with a minimum amount of labor, and that a variety of flavors may be simultaneously frozen at the least expense. It will also be apparent that the gearing is adapted to be readily placed within and removed from an ordinary receptacle without providing bearings in the receptacle and without affecting the use of the latter for other purposes and that salt and ice are excluded from the gearing.

What I claim is—

1. An ice-cream freezer comprising a receptacle provided with a removable cover having bearing-openings, a casing or housing removably arranged on and supported by the bottom of the receptacle and composed of upper and lower horizontal plates spaced apart and connected together, gearing arranged between the plates and protected by the same, and rotary cans located above the casing and detachably connected with the gearing and rotated by the same and arranged in the bearing-openings of the cover and supported by the latter, substantially as described.

2. In an ice-cream freezer, the combination with a receptacle, of a horizontal casing detachably arranged within the receptacle and resting upon the bottom thereof and composed of upper and lower horizontal plates connected together and spaced apart, the upper plate being provided with bearing-openings, a gear-wheel arranged between the plates and having a hub journaled in one of the openings of the upper plate, the pinions located between the plates and meshing with the gear-wheel and provided with hubs journaled in openings of the upper plate and provided with extensions, cans located above the casing and interlocked with the extensions of the hubs of the pinions, a shaft connected with the gear-wheel, and means for rotating the shaft, substantially as described.

3. In an ice-cream freezer, the combination with a receptacle, of a cover mounted thereon and provided with circular bearing-openings and having apertures for the introduction of salt, a casing detachably arranged within and resting upon the bottom of the receptacle, gearing housed within the casing, cans arranged within the bearing-openings of the cover and located above the casing and connected with the gearing, and means for operating the gearing, substantially as described.

In testimony that I claim the foregoing as my own I have hereto affixed my signature in the presence of two witnesses.

GEO. D. CAMPBELL.

Witnesses:
O. O. BIRD,
JNO. S. PITTS.